R. G. WARD.
TRAP.
APPLICATION FILED APR. 28, 1917.

1,242,397.

Patented Oct. 9, 1917.
2 SHEETS—SHEET 1.

Witness
J. R. Smein
R. L. Parker

Inventor
R. G. Ward
By C. A. Snow & Co.
Attorney

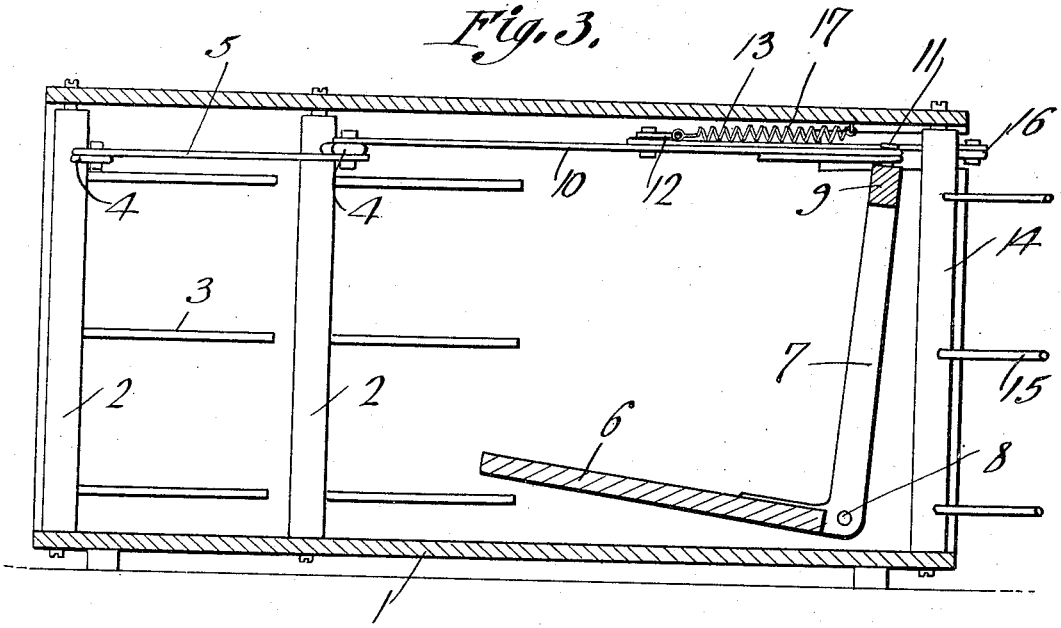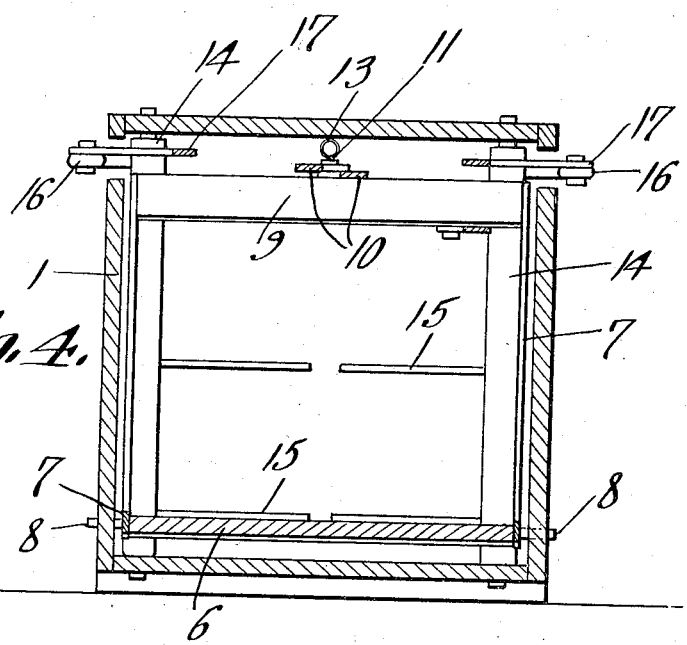

UNITED STATES PATENT OFFICE.

ROBERT GILLESPIE WARD, OF FORNEY, TEXAS, ASSIGNOR OF ONE-HALF TO JOHN TAYLOR CLAYTON, OF FORNEY, TEXAS.

TRAP.

1,242,397.

Specification of Letters Patent.

Patented Oct. 9, 1917.

Application filed April 28, 1917. Serial No. 165,166.

*To all whom it may concern:*

Be it known that I, ROBERT GILLESPIE WARD, a citizen of the United States, residing at Forney, in the county of Kaufman and State of Texas, have invented a new and useful Trap, of which the following is a specification.

The present invention appertains to traps, and aims to provide a trap of novel and improved construction for entrapping or catching animals of various sorts, novel means being provided for operating the various portions of the trap.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawings, wherein:—

Fig. 3 is a longitudinal section on the line 3—3 of Fig. 1.

Fig. 4 is a cross section on the line 4—4 of Fig. 1.

In carrying out the invention, there is provided an elongated casing 1 of any suitable construction having its ends open, and said casing can be arranged in any suitable position or at suitable point for the entrance of the animals thereinto. The construction can be of various sizes for catching various animals.

Figure 1:
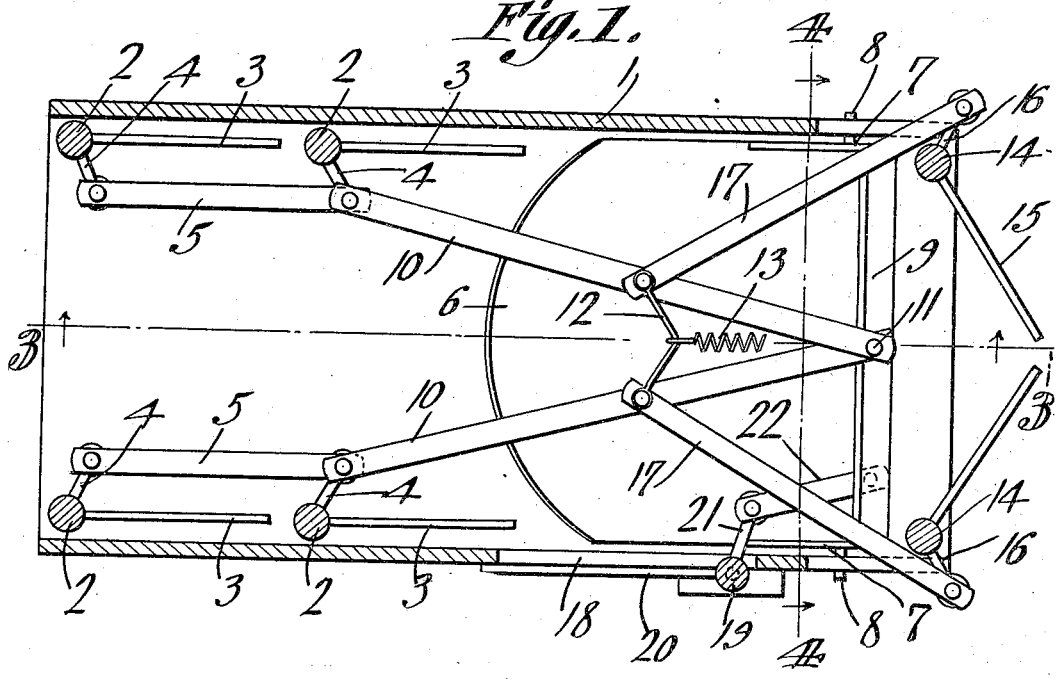
Figure 1 is a plan view of the trap, with the casing shown in section, with the parts in normal position.
Figure 2:
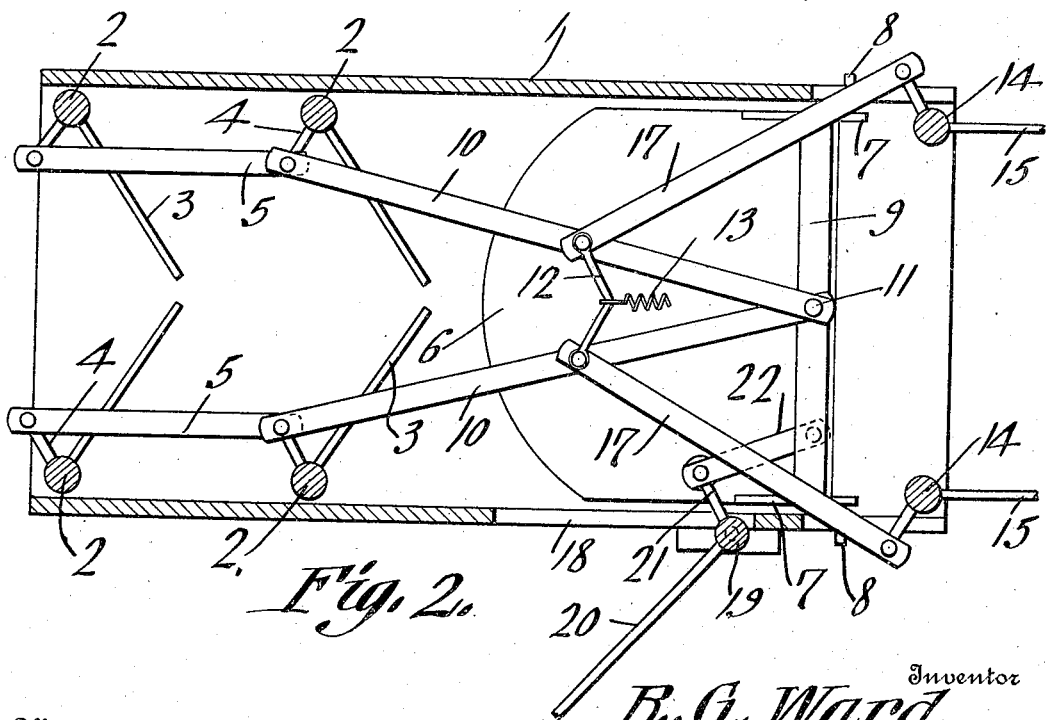
Fig. 2 is a similar view showing the parts when operated by the movement of an animal into the casing.

One end of the casing provides an entrance, and this entrance is open so that the animals can pass through the same into the casing. Several doors are provided for closing the entrance and preventing the escape of the animal therethrough after it has passed into the trap. Thus, posts 2 are mounted for rotation within the casing adjacent to its sides, and fingers or prongs 3 are carried by the posts and are normally swung rearwardly away from the entrance adjacent to the sides of the casing, as seen in Fig. 1. These posts and fingers provide the two double doors. The posts 2 are provided at their upper ends with arms 4 connected by links 5 at each side, whereby the doors of the two pairs operate in unison.

The operating means embodies a platform 6 mounted for vertical movement above the bottom of the casing, and having its rear end portion secured to and disposed between the lower arms of a pair of L-shaped levers 7 which are arranged at the opposite sides of the casing near the rear end thereof. The elbows of the levers 7 are pivoted within the casing, as at 8, and the platform 6 projects forwardly to a point near the rear pair of entrance doors. A cross piece 9 is attached to and disposed between the upper ends of the upwardly projecting arms of the levers 7, and forms with said levers an arch under which the animals can pass out through the rear end of the casing from the platform 6. Forwardly diverging links 10 are pivoted, as at 11, upon the cross piece 9 between the ends of said cross piece, and the forward ends of the links 10 are pivoted to the rear arms 4 and rear ends of the links 5, whereby to swing the arms 4 forwardly when the platform 6 is depressed so as to swing the cross piece 9 forwardly. This will swing the fingers 3 inwardly and forwardly to close the entrance.

A V-shaped yoke 12 has its ends pivoted to the links 10 and said yoke is connected by a coiled wire retractile spring 13 with the top of the casing in rear of the yoke 12, whereby to pull said yoke rearwardly and similarly move the links 10. This will normally move the cross piece 9 rearwardly to raise the platform or tread member 6, and to swing the entrance doors open.

A double exit door is provided for the rear open end of the casing, the same embodying posts 14 mounted for rotation within the casing adjacent to the sides and rear end thereof, and fingers or prongs 15 carried by the posts 14 and normally projecting toward one another so that the rear end or exit of the casing is normally closed. The posts 14 have outstanding arms 16 at their upper ends connected by converging links 17 with the links 10. When the links 10 are moved forwardly, this pulls the links 17 and arms 16 to swing the fingers 15 rearwardly and outwardly to open the exit for the passage of the animal from the casing into a captivity chamber or inclosure (not shown) into which the rear end of the casing opens.

The casing is illustrated as having a second exit 18 in one side thereof at one side of the platform and normally closed by a door embodying a post 19 mounted for rotation upon said side of the casing at the rear of the exit 18, fingers or prongs 20 being carried by the post 19 to normally extend across said exit. The post 19 has an arm 21 extending therefrom at its upper end, and connected by a link 22 with the cross piece 9, so that when the cross piece is moved forwardly by the depression of the platform 6, the link 22 will push the arm 21 to swing the fingers 20 outwardly and rearwardly to enable the animal to escape through the exit 18 into a captivity chamber or inclosure (not shown) into which the exit 18 opens.

Either one of the exit devices can be used by itself, to the exclusion of the other, if desired.

In use, the animals can be attracted into the casing by suitable bait, or the casing can be disposed in the path usually followed by the animals. The animals can readily pass into the casing by way of the entrance, and when an animal steps upon the platform 6, the same is depressed, thereby moving the cross piece 9 forwardly to close the entrance doors and open the exit doors. The animal can therefore pass on through the exit into the captivity chamber, but cannot escape through the entrance. After the animal has passed out through the exit, the spring 13 will return the various parts to normal position, thereby closing the exit doors and preventing the return of the animal into the casing. It will be noted that the doors swing in the direction of movement of the animal into and out of the casing by way of the entrance and exit, but when the animals try to escape, this is frustrated by the projection of the fingers of the doors into the possible avenue of escape.

Having thus described the invention, what is claimed as new is:—

A trap embodying a casing having open ends providing an entrance and exit, a platform within the casing having one end pivoted therein near the exit and projecting toward the entrance, said platform having an arch at its pivoted end, double entrance and exit doors mounted within the casing at the sides thereof, links connecting said arch and entrance doors for closing the latter when the platform is depressed, links connecting said links and exit doors to open the latter when the platform is depressed, and spring means for normally raising the platform.

In testimony that I claim the foregoing as my own, I have hereto affixed my signature in the presence of two witnesses.

<div style="text-align:center">his<br>ROBERT × GILLESPIE WARD.<br>mark</div>

Witnesses to mark:
L. C. REAGIN,
C. C. JORDAN.